United States Patent [19]

Zoll

[11] 4,306,411
[45] Dec. 22, 1981

[54] COMPRESSOR PROTECTIVE CONTROL SYSTEM FOR A GAS TURBINE POWER PLANT

[75] Inventor: August H. Zoll, Cedar Grove, N.J.

[73] Assignee: Curtiss-Wright Corporation, Wood-Ridge, N.J.

[21] Appl. No.: 119,760

[22] Filed: Feb. 8, 1980

[51] Int. Cl.³ .............................................. F02C 3/26
[52] U.S. Cl. .............................................. 60/39.46 S
[58] Field of Search .................... 60/39.46 S, 39.12; 110/263; 122/4 D; 431/7, 170

[56] References Cited

U.S. PATENT DOCUMENTS

| | | | |
|---|---|---|---|
| 2,958,298 | 11/1960 | Mayers | 60/39.46 S |
| 4,086,758 | 5/1978 | Harboe | 60/39.46 S |
| 4,152,890 | 6/1981 | Weiland | 60/39.46 S |
| 4,164,846 | 8/1979 | Moskowitz | 110/263 |
| 4,253,300 | 3/1981 | Willyoung | 60/39.46 S |

OTHER PUBLICATIONS de Biaso, V. *AEP Designing a 60-Mn "PFB" Gas Turbine Plant*, in Gas Turbine World, Mar. 1977, pp. 24–29.

Primary Examiner—Louis J. Casaregola
Attorney, Agent, or Firm—Arthur L. Frederick

[57] ABSTRACT

The protective control system for a gas turbine power plant having a pressurized fluidized bed combustor provides check valve means located in the passage supplying compressed air from a compressor to the combustor so as to prevent, upon loss of load or shutdown of the plant, reverse flow of high pressure, high temperature, dirty gaseous fluid from the combustor to the compressor and thereby prevent contamination, surging and damage to the compressor. Also a vent means is provided downstream of the combustion gas clean-up system to effect blowdown or depressurization of the combustor.

4 Claims, 1 Drawing Figure

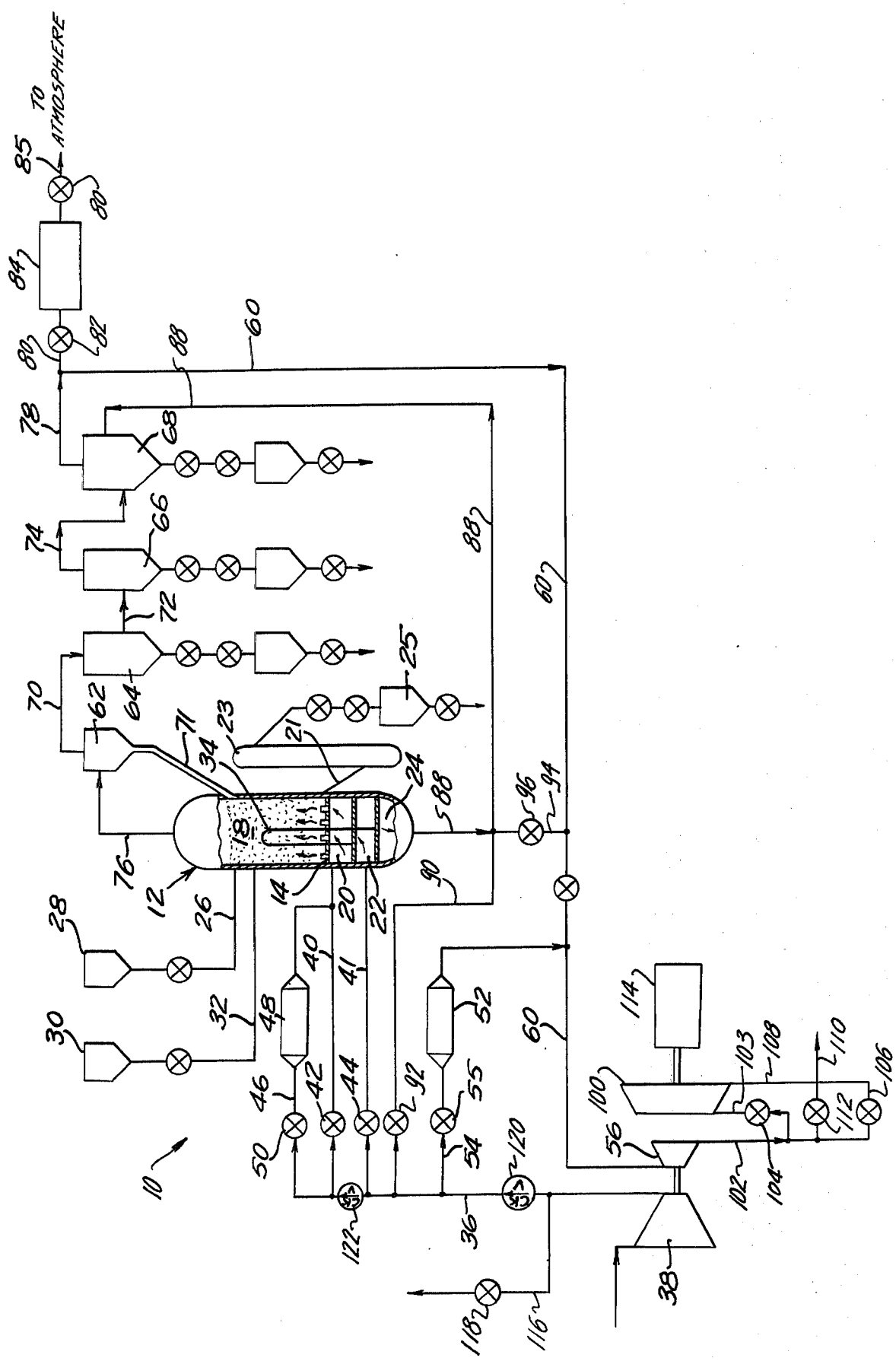

COMPRESSOR PROTECTIVE CONTROL SYSTEM FOR A GAS TURBINE POWER PLANT

The present invention relates to a gas turbine power plant with a pressurized fluidized bed for the burning of particulate coal, and more particularly a protective control system for such power plant.

BACKGROUND OF THIS INVENTION

The gas turbine power plant, as exemplified in the U.S. Pats. to Jubb et al No. 3,791,137, dated Feb. 12, 1974, and Moskowitz et al, No. 4,164,846 dated Aug. 21, 1979, and the article by V. de Biasi entitled "AEP designing a 60-Mw 'PFB' gas turbine plant" which appeared in the March 1977 issue of Gas Turbine World magazine, comprise a fluidized bed reactor or combustor in which compressed air from a gas turbine driven compressor is utilized to suspend particles of coal and sulphur dioxide sorbent and to provide the oxygen for support of the burning of the coal. The gaseous products of combustion are conducted from the combustor, through separators for removal of entrained solids (gas clean-up system), to a gas turbine for driving a load, such as an electrical generator.

In the operation of such gas turbine power plants, a problem encountered is compressor surging and damage resulting therefrom upon load loss when the gas turbine is intentionally or accidentally shutdown. Since the fluidized bed combustor and the separator or combustion product clean-up system provides an extremely large volume of pressurized, high temperature gaseous fluid (as for example, a gas volume of about 55,000 cubic feet at a temperature between 371° C. and about 1051° C.) which cannot be dissipated quickly, there occurs flow of gaseous fluid from the fluidized bed combustor in a direction toward the compressor when the plant is shutdown and the compressor output is diminished or dumped. This backflow of hot gaseous fluid causes a back pressure at the compressor discharge port which surges into the compressor and may cause damage to the compressor. Also, further damage to the compressor and other components may occur because of the hot gases, and particulate solids, such as unburned coal, dolomite and ash, entrained in the gaseous fluid.

It is, therefore, an object of this invention to provide a protective control system for a gas turbine power plant having a pressurized, fluidized bed combustor, which system obviates surging of the compressor and entrained solids carryover into the compressor upon loss of turbine loading.

Another object of the present invention is to provide a protection control system for a gas turbine power plant having a pressurized fluidized bed combustor, which system permits shutdown of the plant, including the fluidized bed combustor, without backflow of gaseous fluid from the fluidized bed combustor to the compressor and the resulting surging and damage to the compressor.

SUMMARY

It is, therefore, contemplated by the present invention that a protective control system be provided in a gas turbine power plant of the type having a pressurized fluidized bed combustor in which particulate solid fuel is burned to produce pressurized combustion gases. An air compressing means having air inlet and air discharge ports is connected by a first conduit means to conduct compressed air from the compressor air discharge port of the pressurized fluidized bed combustor for suspending the particulate solid fuel and inert materials (fluidization) and support combustion of the fuel. The plant also has an expander, as for example a gas turbine, connected by a second conduit means to receive combustion gases from the fluidized bed combustor to thereby be driven.

The protective control system comprises a valve means in the second conduit means for controlling flow of combustion gases therethrough and in one operative position functions to stop flow of combustion gases to the expander. An automatic means, as for example check valve means, is located in the first conduit means to present flow of gaseous fluids in the first conduit means, from the fluidized bed combustor, in a direction toward the air compressing means. A vent means is provided for blowdown of the fluidized bed combustor upon shutdown of the plant.

The protective control system in a narrower scope of the invention comprises the first conduit means, including three branch conduits, for conducting one portion of the compressed air from the compressing means to the fluidized bed combustor for suspending particulate fuel solids and sulphur dioxide sorbent and supporting the particulate solid fuel for combustion, for conducting a second portion of the compressed air to a heat exchanger in the fluidized bed combustor for controlling the temperature of the latter, and for conducting a third portion of the compressed air to separating means for assisting in the removal of entrained solids in the combustion gases and wherein the automatic means includes at least two check valves, one being located between two of the branches of the conduit means while the other check valve is disposed between the discharge port of the compressing means and the other of the three branches.

BRIEF DESCRIPTION OF THE DRAWING

The invention will be more fully understood from the following description, when considered in connection with the accompanying drawing, in which a gas turbine plant having a pressurized fluidized bed combustor is shown with the protective control system according to this invention.

DESCRIPTION OF THE PREFERRED EMBODIMENT

Now referring to the drawing, the reference number 10 generally refers to the gas turbine power plant having a protective control system according to this invention.

The power plant 10 comprises a pressurized fluidized bed combustor 12 which is provided with three transversely extending partitions 14, 15 and 16 which divide the interior of the fluidized bed combustor into a reaction or combustion zone 18, two inlet plenums 20 and 22 and an outlet plenum 24. The fluidized bed combustor 12 is connected, via a conduit 26, to a particulate solid fuel supply means 28 to receive particulate solid fuel in the combustion zone 18. The particulate solid fuel for burning in fluidized bed combustor 12 may be coal. Also, the fluidized bed combustor 12 is connected to a supply means 30, via a conduit 32, to receive in combustion zone 18 a sulphur dioxide absorbing material, as for example crushed dolomite. The partition 14 may be perforated or be provided with tuyeres to distribute air from plenum 20 into combustion zone 18. To control the reaction temperature in combustion zone 18, a heat exchanger 34 is disposed in combustion zone 18 and is connected to receive air from inlet plenum 22 and to discharge heated air into outlet plenum 24. Ash produced in combustion zone 18 is removed from combustion zone 18 through a discharge conduit 21, an ash cooler 23 and an ash hopper 25.

Compressed air is supplied to inlet plenum 20 from a compressor 38 by way of a main pipe 36 and branch pipe 40, while cooling air from air compressor 38 is delivered to inlet plenum 22 by way of main pipe 36 and another branch pipe 41. Flows of compressed air through branch pipes 40 and 41 are regulated by valves 42 and 44 in the respective pipes. The valves 42 and 44 are adjusted to provide a distribution of the compressed air discharged by compressor 38 so that about one third ($\frac{1}{3}$) is conducted to plenum 20 for suspension of the fuel particles and for support of combustion of the fuel, while about two-thirds ($\frac{2}{3}$) of the air is delivered to plenum 22 for flow through heat exchanger 34 and cooling of the combustion zone 18.

A bypass pipe 46 is connected at one end to main pipe 36 to receive, from the latter, compressed air and to pass the compressed air to an auxiliary combustor 48. Fuel, such as oil or gas, is selectively injected into auxiliary combustor 48 to provide hot gases to pipe 40 and thence to plenum 20 when it is necessary to heat the compressed air, as in the start-up mode of operation. A valve 50 is provided in bypass pipe 46 to control flow of compressed air to auxiliary combustor 48.

A start-up combustor 52 is connected by a pipe 54 to main pipe 36 to receive compressed air from the latter for the combustion of oil or gas fuel therein and the generation of combustion gases. A valve 55 is provided in pipe 54 for controlling flow through the pipe. The combustion gases are carried from the start-up combustor to a turbine 56 by way of pipe 58 and a clean combustion gas pipe 60. The clean combustion gas pipe 60 has a valve 61. The turbine 56 is connected to drive compressor 38.

A clean-up system is provided in plant 10, which system comprises a plurality of separators 62, 64, 66 and 68 which are serially connected together by conduits 70, 72, and 74 to sequentially receive combustion gases discharged from fluidized bed combustor 12 through an outlet conduit 76. Separator 62 is connected through a conduit 71 to fluidized bed combustor 12 so that unburned particles of fuel entrained in the combustion gases and separated therefrom in separator 62 are returned to the combustion zone 18 for burning. The clean combustion gases are discharged from separator 68 by outlet conduit 78 and thence flowed into clean combustion gas pipe 60 for passage to turbine 56. The outlet conduit 78 is also connected to a vent means comprising a pipe 80 which has a valve 82 and is connected to a pressurized water scrubber 84, the water scrubber 84 being vented through a pipe 85 through which flow of fluid is controlled by a valve 86. Separator 68 is of a type which requires air and, therefore, is connected to fluidized bed combustor 12 by a pipe 88 which communicates, at one end, with outlet plenum 24 of fluidized bed combustor 12 and, at the other end, communicates with separator 68. Some compressed air can be delivered directly to separator 68, through a bypass pipe 90 which is connected to main pipe 36 and pipe 88. A valve 92 is disposed in pipe 90 to control flow therethrough. Compressed air can be made to bypass separator 68 and flow into clean combustion gas pipe 60, via bypass pipe 94 which has a valve 96.

The gas turbine 56 is connected to exhaust combustion gases to a free power turbine 100 by conduits 102 and 103. An isolation valve 104 is disposed in conduit 103 to control flow of exhaust gases from turbine 56 into power turbine 100. Also a valve controlled bypass conduit 106 is provided to pass exhaust gas from turbine 56 to the discharge conduit 108 of power turbine 100. A conduit 110 is provided to conduct exhaust gas from exhaust conduit 108 of free turbine 100 to a waste heat boiler (not shown) or from exhaust conduit 102 of turbine 56. A valve 112 is provided in conduit 110 to permit exhaust gas from turbine 56 to bypass free power turbine 100 and to be conducted to the waste heat boiler. The free power turbine 100 is connected to drive a load such as an alternator 114.

The protective control system according to this invention comprises a bypass pipe 116 which is connected to main pipe 36 and at the other end to atmosphere, via a silencer (not shown). The bypass pipe 116 has an anti-surge valve 118 which can be opened to dump compressed-air-discharge to atmosphere upon emergency shutdown of the plant on sudden load loss. An automatic means for preventing flow of gaseous fluid in main pipe 36 in a direction from fluidized bed combustor 12 to compressor 38 is provided. This automatic means comprises at least one check valve 120 disposed in main pipe 36 downstream from the junction of pipe 116 and main pipe 36 and, may include, a second check valve 122 disposed in main pipe 36 between the junctures of pipes 38 and 40 with main pipe 36. The check valve 122 functions to prevent flow of gases from fluidized bed combustor 12 into turbine 56 via pipes 38, 36, 54, 58 and 60 or pipes 38, 36, 90, 94 and 60 in situations where valves 42, 50 and 55 or valves 42, 50, 92, 96 and 61 remain open upon sudden loss of load or shutdown of the plant. To effect shutdown of plant 10 and the blowdown or depressurization of fluidized bed combustor 12 and the clean-up system comprising separators 64, 66 and 68, valves 82 and 86 are opened and valve 61 is closed to thereby vent the fluidized bed combustor and clean-up system through pipes 80 and 85. The vented gases are scrubbed in scrubber 84 before being discharged into the atmosphere to avoid any possibility of pollution.

It is believed that it is now readily apparent that a protective control system for a gas turbine plant, having a pressurized fluidized bed combustor, has been disclosed which permits an air compressor to be vented during load losses and the pressurized fluidized bed combustor to be blowndown without causing the air compressor to surge or to be damaged by particulate solids entering the compressor through its discharge port.

Although but one embodiment has been illustrated and described in detail, it is to be expressly understood that the invention is not limited thereto. Various changes can be made in the arrangement of parts without departing from the spirit and scope of the invention as the same will be now understood by those skilled in the art.

What is claimed is:

1. In a gas turbine power plant having
   (a) a pressurized fluidized bed combustor having a heat exchanger therein and means for receiving therein pulverized fuel for burning to thereby produce combustion gases;

(b) an air compressing means having air inlet and air discharge ports;

(c) a first conduit means communicating the air discharge port of said compressing means with the fluidized bed combustor;

(d) an expander means;

(e) a second conduit means, including separating means for removing entrained solid particulates from the combustion gases, for conducting combustion gases from the fluidized bed combustor to said expander means to drive the latter;

(f) said first conduit means includes three branch conduits for conducting one portion of the compressed air from the air compressing means to the fluidized bed combustor, for conducting a second portion of said compressed air discharged from the air compressing means to said heat exchanger and for conducting a third portion of said compressed air discharged from the air compressing means to said separating means;

(g) a protective control system comprising (g-1) valve means in said second conduit means for controlling flow of combustion gases therethrough and in one operative position stopping flow of combustion gases to said expander;

(g-2) a first check valve in said first conduit means and located between the two branch conduits, one of which conducts compressed air to the fluidized bed combustor and the other of which conducts compressed air to the heat exchanger; and (g-3) a second check valve disposed in the first conduit means between said air discharge port of the air compressing means and the said three branch conduits.

2. The gas turbine power plant of claim 1 wherein a valve controlled bypass conduit is connected to said first conduit between said discharge port of the air compressing means and said three branch conduits and downstream of said second check valve to bypass compressed air around said fluidized bed combustor.

3. The gas turbine power plant of claim 1 wherein said expander means includes a gas turbine connected to drive the air compressing means and a free turbine connected to receive exhaust gas from the gas turbine to be driven by the latter and connected to a load to drive the latter.

4. The gas turbine power plant of claim 1 wherein a vent means coacts with the fluidized bed combustor to effect blowdown of the latter.

* * * * *